United States Patent [19]

Romp

[11] 4,346,286
[45] Aug. 24, 1982

[54] TEMPERATURE CONTROLLED ELECTRICAL POWER SUPPLY APPARATUS

[75] Inventor: Frederick J. Romp, Keysborough, Australia

[73] Assignee: Canargo International Pty. Ltd., Victoria, Australia

[21] Appl. No.: 236,457

[22] Filed: Feb. 20, 1981

[51] Int. Cl.³ .............................................. H05B 1/02
[52] U.S. Cl. .................................... 219/501; 219/528; 219/549; 219/505; 219/507; 156/583.7
[58] Field of Search .............. 219/528, 549, 501, 504, 219/505, 494, 243, 212, 507, 510; 156/583.1, 583.7, 499

[56] References Cited

U.S. PATENT DOCUMENTS

| | | | |
|---|---|---|---|
| 3,794,950 | 2/1974 | Kilner | 219/505 |
| 4,031,352 | 6/1977 | Oosterberg | 219/501 |
| 4,108,713 | 8/1978 | Weisz | 219/505 |

*Primary Examiner*—B. A. Reynolds
*Assistant Examiner*—M. Paschall
*Attorney, Agent, or Firm*—Watson, Cole, Grindle & Watson

[57] ABSTRACT

Temperature controlled electrical power supply apparatus for heating carpet-joining tape of the type having a conducting foil adapted to be heated by electric current to melt adhesive thereon includes first control circuitry for receiving A-C power supply voltage and a first adjustable resistor to provide an adjustable high current output. A switch is parallelly connected with the first normally open contacts of a first relay and actuated by the closure of a switch with second normally open contacts of that relay closed to enable the high current output. Second control circuitry includes a thermistor adapted to be connected in thermal contact with the foil such that the high current output is interrupted when the temperature of the foil reaches a preset temperature so as to maintain the foil temperature substantially constant. An SCR includes a gate circuit connected to the thermistor for controlling a second relay to interrupt the high current output.

6 Claims, 2 Drawing Figures

TEMPERATURE CONTROLLED ELECTRICAL POWER SUPPLY APPARATUS

BACKGROUND OF THE INVENTION

1. Field of the Invention

The present invention relates to a temperature controlled electrical power supply apparatus and in particular to an electrical current supply apparatus for use in heating the conducting foil of carpet joining tape. In the particular type of carpet joining tape considered here the conducting foil is heated by passage of electrical current to melt adhesive on the foil for adhesion to the back of the carpet. It should be evident that the apparatus of the invention, while described below in relation to a carpet joining tape, is suitable for use in any other application where it is desired to maintain a substantially constant temperature over a period of time.

2. Prior Art

The existing electrical apparatus for heating the conducting foil of carpet tape comprises an adjustable high current supply. The user connects supply leads to the foil and sets the current to the desired level by a control knob on the apparatus. The major problem occurring with the existing apparatus stems from the fact that, as the foil heats up, its resistance varies considerably causing the current to fluctuate to the extent that the user is continually having to re-adjust the control knob in order to maintain the current at a level whereby the temperature of the foil is suitable. Invariably the user is unable to maintain the temperature at a suitable level while performing the task of joining the carpet edges. Hence the adhesive either does not melt properly or it becomes too hot making it difficult to work with and delaying the curing process. Needless to say it is most inconvenient for the user to be continually re-adjusting the control knob since this usually involves moving a substantial distance to the apparatus particularly when working with long carpet joints.

SUMMARY OF THE INVENTION

Accordingly it is an object of this invention to provide an improved electrical power supply apparatus which avoids, or at least reduces, the aforementioned problem.

It is another object of this invention to provide an improved method for joining carpet utilizing the apparatus according to the invention.

The invention thus provides a temperature controlled electrical power supply apparatus for heating carpet joining tape of the kind having a conducting foil adapted to be heated by electric current to melt adhesive thereon, the apparatus comprising first control circuitry for receiving mains A-C supply and providing an adjustable high current output, second control circuitry including a temperature sensor adapted to be connected in thermal contact with the foil and including switching circuitry associated with the sensor to interrupt the high current output when the temperature of the foil reaches a temperature preset by temperature adjusting circuitry in the second control circuitry, whereby the temperature of the foil is maintained at a substantially constant temperature.

The invention further provides a method for joining carpet utilizing carpet joining tape of the kind having a conducting foil adapted to be heated by electric current to melt adhesive thereon, the method using the apparatus as defined in the preceding paragraph and including the steps of:

(1) connecting output leads from the output of a transformer of the apparatus to opposite ends of the foil, (2) connecting an alligator clip containing a thermistor of the apparatus onto the foil about six inches from one end thereof, (3) setting a second adjustable resistor of the apparatus to the required adhesive melting temperature, (4) connecting mains supply to the apparatus and switching the apparatus into the "on" condition, (5) resetting a first adjustable resistor of the apparatus to a position to cause minimum the output unless the first resistor is already in such a position and subsequently adjusting the first adjustable resistor until a meter of the apparatus indicates the maximum allowable secondary current according to the particular mains supply in use, and (6) joining the carpet in a manner known per se when the adhesive has reached the predetermined melt temperature.

BRIEF DESCRIPTION OF THE DRAWINGS

In order that the invention may be more readily understood one particular embodiment will now be described with reference to the accompanying drawings wherein.

DETAILED DESCRIPTION

Figure 1:
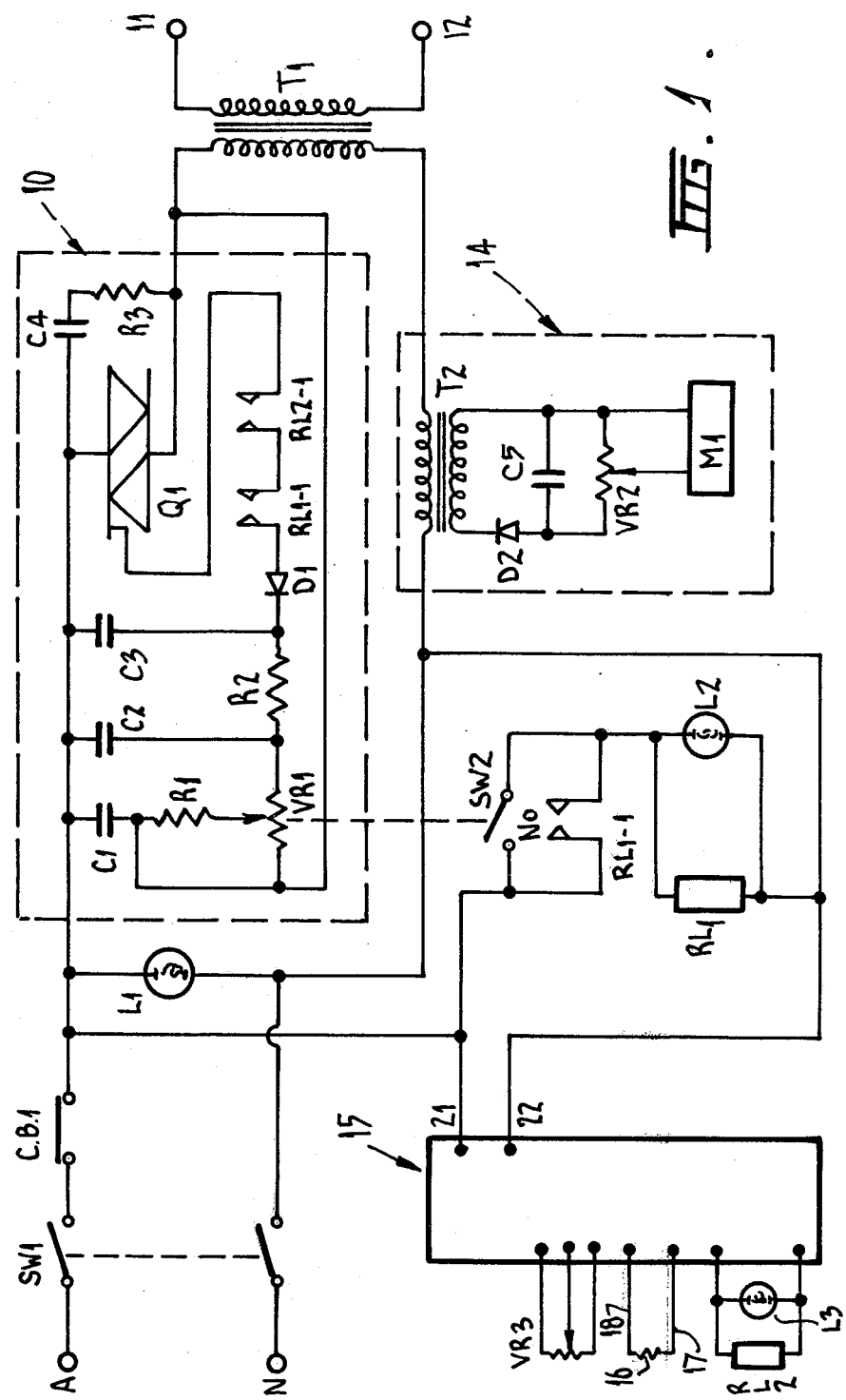
FIG. 1 is a schematic circuit diagram of apparatus in accordance with the embodiment and FIG. 2 is a circuit diagram of the temperature control part of the apparatus shown in FIG. 1.

In the drawings input terminals A and N are adapted to receive mains input power supply which is usually 110 volts or 240 volts alternating current (A-C). A mains switch SW1 on the apparatus enables activation of the apparatus and a circuit breaker CB1 provides protection in the event of a fault in the apparatus which would cause overloading of the mains supply. A lamp L1 is a mains indicator light to indicate when the apparatus is in the "on" or activated state.

The mains power is provided to an output transformer T1 via a control circuit represented within the broken lines 10. The transformer T1 provides an output across secondary terminals 11–12 of about 28 volts A-C.

The control circuit 10 consists essentially of a triac Q1 which provides a controlled or switched input to the primary of transformer T1 and thereby controls the output current from T1 at the secondary thereof. In a practical embodiment the triac Q1 would comprise a number of triacs connected in parallel to handle the necessary primary current to transformer T1. The capacitors C1, C2 and C3 together with fixed resistors R1 and R2, variable resistor VR1 and diode D1 set a pulse on the gate of the triac Q1 to cause firing of the triac and hence energization of the primary of transformer T1. Variation of the variable resistor VR1 changes the firing pulse of the triac within each cycle of the A-C supply and hence varies the effective primary current of transformer T1 with the consequence that the secondary current thereof is proportionately varied. Relay contacts RL1-2 and RL2-1 in the gate circuit to Q1 are respective contacts of relays RL1 and RL2 to be described below. A capacitor C4 and resistor R3 are connected across the triac Q1.

A mechanical connection represented by broken line 13 extends from the moveable control arm of variable resistor VR1 to actuate a switch SW2 in a manner whereby the resistor VR1 must be reset, to a position causing zero or negligible output from transformer T1, in order to close the switch SW2. The switch SW2 is connected in series with a coil of a relay RL1 across the input supply and thus closing of the switch SW2 energizes the coil of RL1. It should be noted that switch SW2 is in parallel with contacts RL1-1 of relay RL1. The contacts RL1-1 are normally open, that is, in the absence of supply to relay RL1 they are open. Once relay RL1 is energized contacts RL1-1 close and thus the relay RL1 is maintained in the energized state whether or nor SW2 remains closed. A lamp L2 across the relay RL1 indicates the apparatus is in the control position ready for use. At the closing of RL1 the contacts RL1-2 in the control circuit 10 are closed from the normally open position they assume in the "off" condition of the apparatus. Since contacts RL2-1 in the control circuit are normally closed the gate circuit of triac Q1 the transformer T1 may be energized by adjusting the resistor VR1 subject of course to the contacts RL2-1 remaining closed.

A metering circuit enclosed within the broken lines 14 facilitates metering of the high current output of T1 by suitable calibration of the meter M1. The metering circuit 14 comprises a transformer T2, a rectifier circuit D2,C5, and adjustable receiver VR2 and the meter M1. The adjustable resistor VR2 facilitates alteration of the range of the meter M1.

Figure 2:
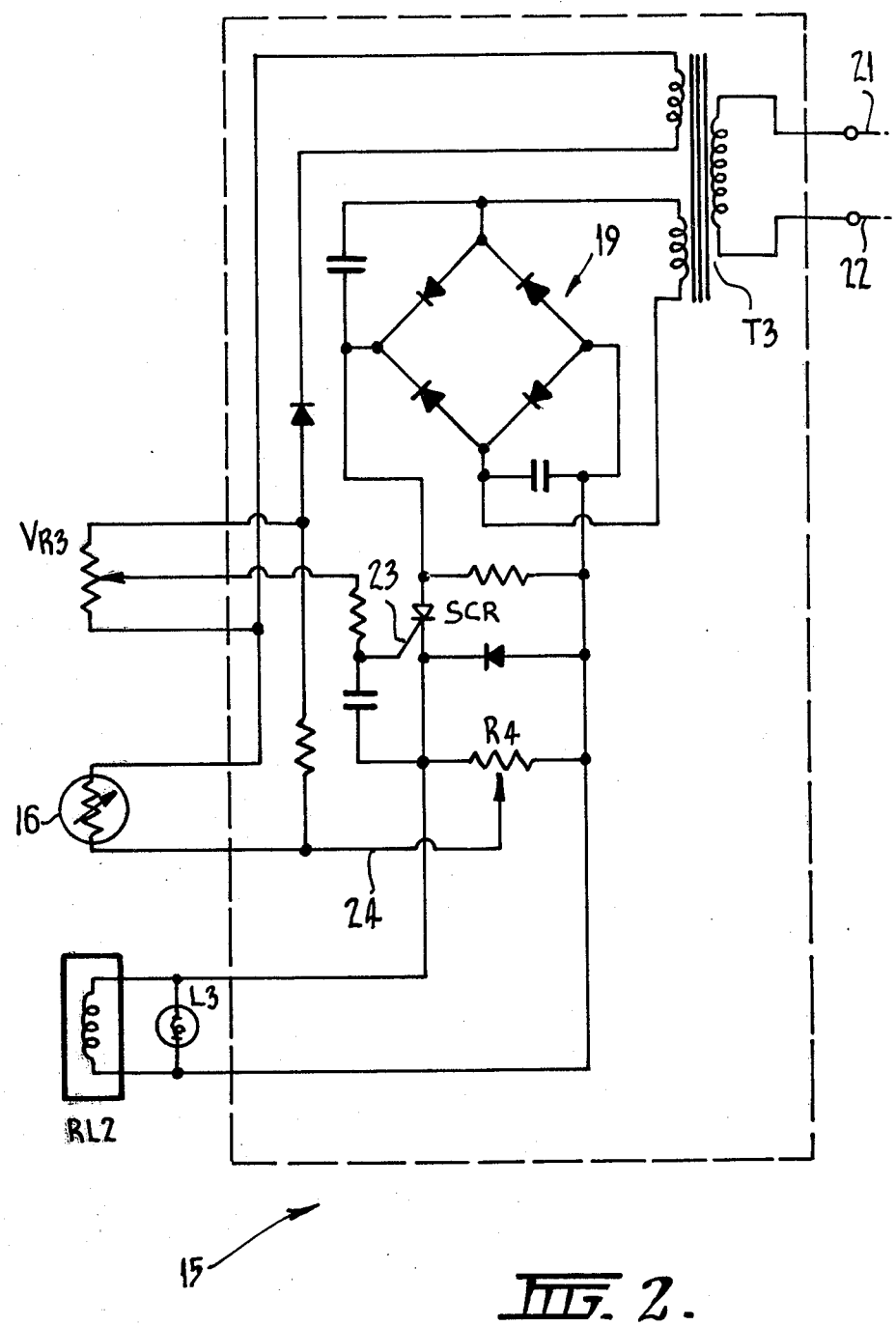

Now to the temperature control circuitry represented generally by reference 15 in FIG. 1 and shown in more detail in FIG. 2. The temperature control circuitry 15, in combination with the control circuit 10 serves to keep carpet joining tape at a substantially constant temperature. The temperature control circuitry consists essentially of an adjustable resistor VR3, a thermistor 16 and a relay RL2 with indicating lamp L3 for establishing when the relay is in the energized condition. The thermistor 16 is mounted inside an alligator type clip (not shown) which is in turn connected to the temperature control circuitry 15 by leads 17 and 18 which are sufficiently long to facilitate, in use, location of the thermistor 16 against the foil (not shown) of carpet joining tape about six inches from the end of the particular piece of tape. The connection of the thermistor to the foil is made merely by clipping the alligator clip to the foil and the mounting of the thermistor in the clip is critical to the extent that it should make reasonably good contact with the foil.

Referring now to FIG. 2 the temperature control circuitry is shown to further include a transformer T3 which receives the mains supply voltage on connections 21 and 22 shown in FIG. 1 and which has two secondary windings for supplying low voltage to rectifier bridge 19 and the resistor VR3, thermistor 16, respectively. The bridge 19 supplies direct current to the coil of relay RL2 via a silicon controlled rectifier SCR. The control signal to the gate 23 of the SCR therefore causes operation of the relay by switching the SCR "on" to actuate the relay. The control signal is derived from the resistor VR3 and from the signal on connection 24 which is dependent upon the resistive value of the thermistor 16. The signal on connection 24 is provided to gate 23 via variable resistor R4 for the purpose of calibration of the thermistor control. The signal to gate 23 from resistor VR3 is via resistor R3. The adjustment of resistor VR3 thus determines the current required through thermistor 16, and hence the temperature of the foil, necessary to reduce the control signal to gate 23 to switch off the SCR and hence the relay RL2. Specifically, as the temperature of the thermistor increases its resistance decreases hence reducing the control signal to the gate 23 which, dependent upon the position of VR3 will reduce to a level whereupon the SCR will not conduct. Once the relay RL2 is switched off the contacts RL2-1 in the control circuit 10 are opened and the output from transformer T1 ceases. As soon as the foil cools slightly the current through thermistor 16 will drop and the SCR will be caused to conduct again, actuating RL2 and closing the contacts RL2-1. Output current will then flow again from T1. The purpose of the components of the temperature control circuitry shown in FIG. 2 and not specifically referred to herein will be readily apparent to persons skilled in the art.

In use the apparatus is operated in the following manner. Firstly, the aforementioned alligator clip (not shown) is connected to the foil of the length of carpet joining tape (not shown) about six inches from one end in a manner whereby the thermistor 16 is in intimate contact with the foil. Heavy current output leads (not shown) are connected to the respective terminals 11 and 12 of transformer T1. The other ends of the output leads are provided with clips which are attached to respective ends of the foil. The adjustable resistor VR3 is then set to the required melting temperature for the particular adhesive of the carpet joining tape in use and for this purpose the resistor VR3 is calibrated with a temperature scale. Next the apparatus is connected to the appropriate mains supply and switch SW1 is actuated causing lamp L1 to illuminate indicating mains supply is present. If the lamp L2 does not illuminate it indicates VR1 is not in the reset position, that is, the position wherein no current flows from transformer T1. This prevents the apparatus from being turned on and causing an initial high current output to flow. Once VR1 has been reset relay RL1 will operate and then VR1 is moved to increase the output current to a level, indicate by meter M1, appropriate to the particular mains supply. It is usual to have a red line marked on the meter M1 for the purpose of indicating the limit of secondary current which will not cause overload on the primary side. The apparatus will now function to automatically maintain the temperature of the foil at the preset temperature. In cases where the apparatus is designed for use with carpet joining tape of the kind described in earlier Australian patent application No. 57288/80 owned by the present applicant, the apparatus may be made extremely light and compact since according to the tape in question, the foil is divided lengthwise of the tape and hence only about half the traditional amount of current is required.

It should be apparent from the description hereinabove that the present invention provides a considerably improved apparatus for joining carpet using electrically heated carpet joining tape. The aforementioned problems of the prior art are obviated as the apparatus is easier to use and is generally much lighter in weight than previous apparatus. The ability to be able to preset the apparatus to the particular melting temperature required is a most desirable feature particularly since the various different adhesives now being used have different melting temperatures.

What is claimed is:

1. Temperature controlled electrical power supply apparatus for heating carpet-joining tape of the kind having a conducting foil adapted to be heated by electric current to melt adhesive thereon, said apparatus comprising:

first control circuitry for receiving AC power supply voltage and including a set of electrical contacts to provide an adjustable high current output, a first adjustable resistor for enabling adjustment of said high current output, a switch parallelly connected with the first normally open contacts of a first relay and mechanically connected with said switch such that closure thereof activates said first relay, said first relay including second normally open contacts which are closed to enable said high current output; and second control circuitry including a thermistor adapted to be connected in thermal contact with said foil, switching circuitry connected to said thermistor to interrupt said high current output when the temperature of said foil reaches a preset temperature to maintain the temperature of said foil at a substantially constant temperature, said second control circuitry further including an SCR with a gate circuit connected to said thermistor, a second relay controlled by said SCR for controlling said set of electrical contacts to interrupt said high current output and connected in series with said second normally open contacts.

2. Apparatus according to claim 1 wherein said first control circuitry consists essentially of a triac circuit for controlling the current to a primary winding of a heavy current output transformer, an activating gate pulse for said triac circuitry being provided by a resistor/capacitor circuit including said first adjustable resistor, and said set of contacts of siid second relay and said second normally open contacts of said first relay being adapted to interrupt a gate circuit to said triac circuitry to isolate said gate pulse.

3. An apparatus according to claim 2 wherein said thermistor is mounted inside an alligator clip in a manner whereby when said alligator clip is clipped onto said foil said thermistor is in good thermal contact with said foil, said clip being connected to said second control circuitry by leads to facilitate location of said thermistor along the length of said foil.

4. An apparatus according to claim 3 wherein a second adjustable resistor is provided in said second control circuitry for influencing said signal to the gate circuit of said SCR whereby the temperature at which said SCR is switched off to cause deactivation of said second relay may be varied, said second adjustable resistor being calibrated to provide a range of temperature settings to which it may be adjusted.

5. An apparatus according to claim 4 further comprising metering circuitry with a meter for providing a read-out of the value of said heavy current, said metering circuitry being arranged in the primary circuit of said transformer.

6. A method for joining carpet utilizing carpet joining tape of the kind having a conducting foil adapted to be heated by electric current to melt adhesive thereon and including the steps of:

connecting output leads from the output of a transformer to opposite ends of said foil;

connecting said alligator clip onto said foil about six inches from one end thereof;

setting a first adjustable resistor to the required adhesive melting temperature;

connecting mains supply to said apparatus and switching said apparatus into the "on" condition, resetting a second adjustable resistor to a position to cause minimum output unless said first resistor is already in such a position and subsequently adjusting said first adjustable resistor until said meter indicates the maximum allowable secondary current according to the particular mains supply in use; and joining said carpet in a manner per se when said adhesive has reached the predetermined melt temperature.

* * * * *